March 13, 1962 C. K. WILSON ET AL 3,024,822
TOMATO CORING MACHINE
Original Filed May 28, 1954 5 Sheets-Sheet 1
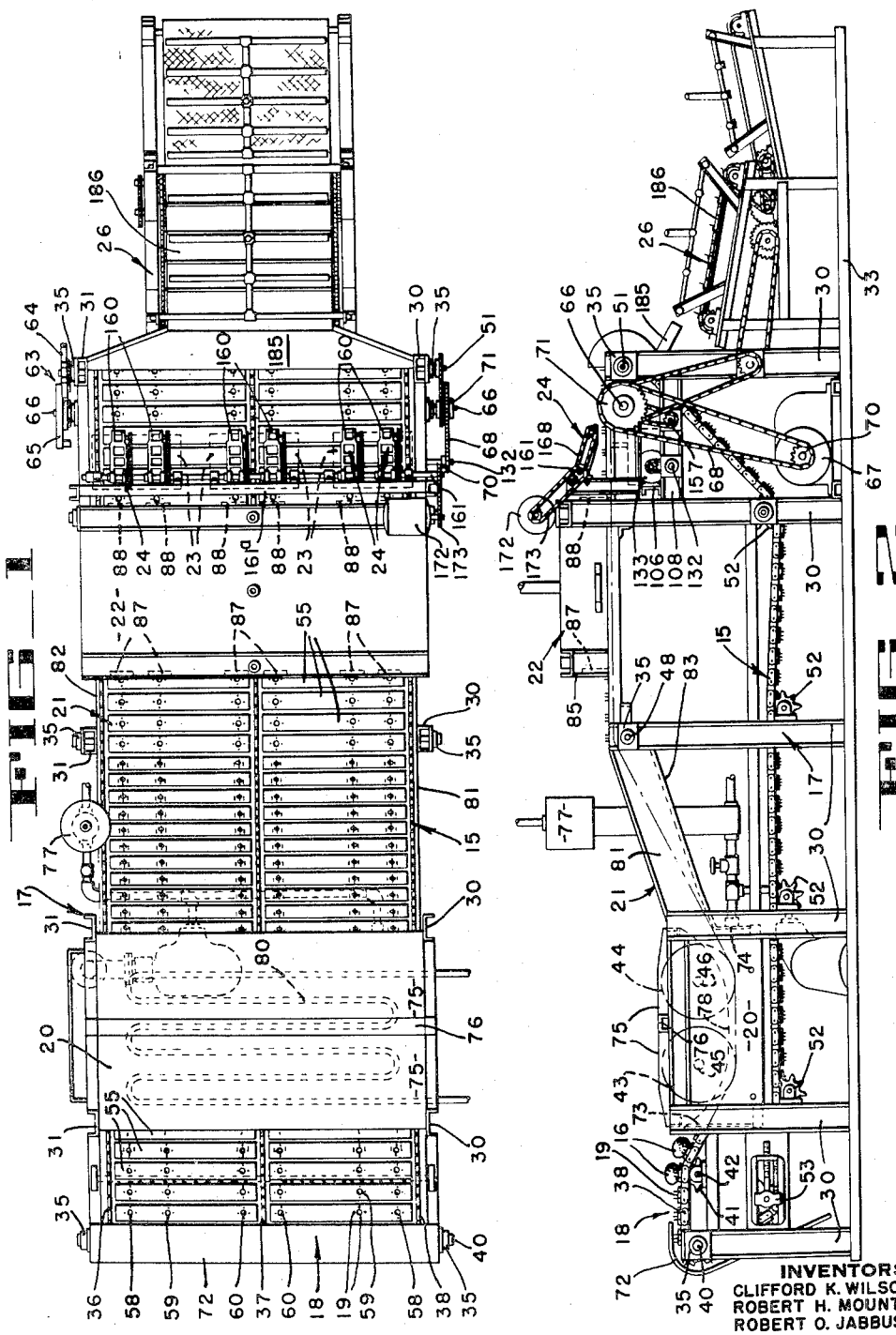
INVENTORS
CLIFFORD K. WILSON
ROBERT H. MOUNT
ROBERT O. JABBUSCH
BY Hans G. Hoffmeister
ATTORNEY

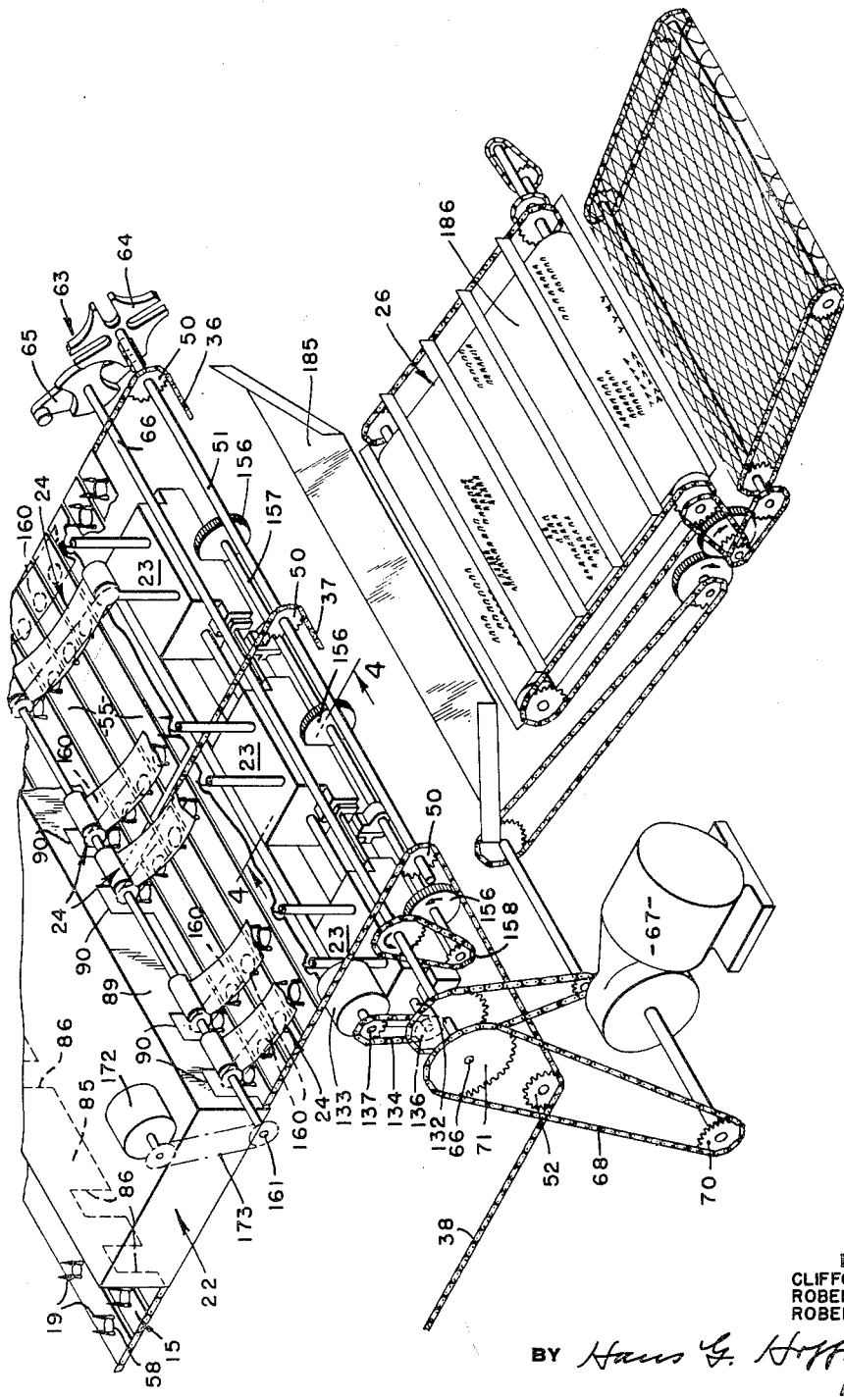

March 13, 1962 C. K. WILSON ET AL 3,024,822
TOMATO CORING MACHINE
Original Filed May 28, 1954 5 Sheets-Sheet 3
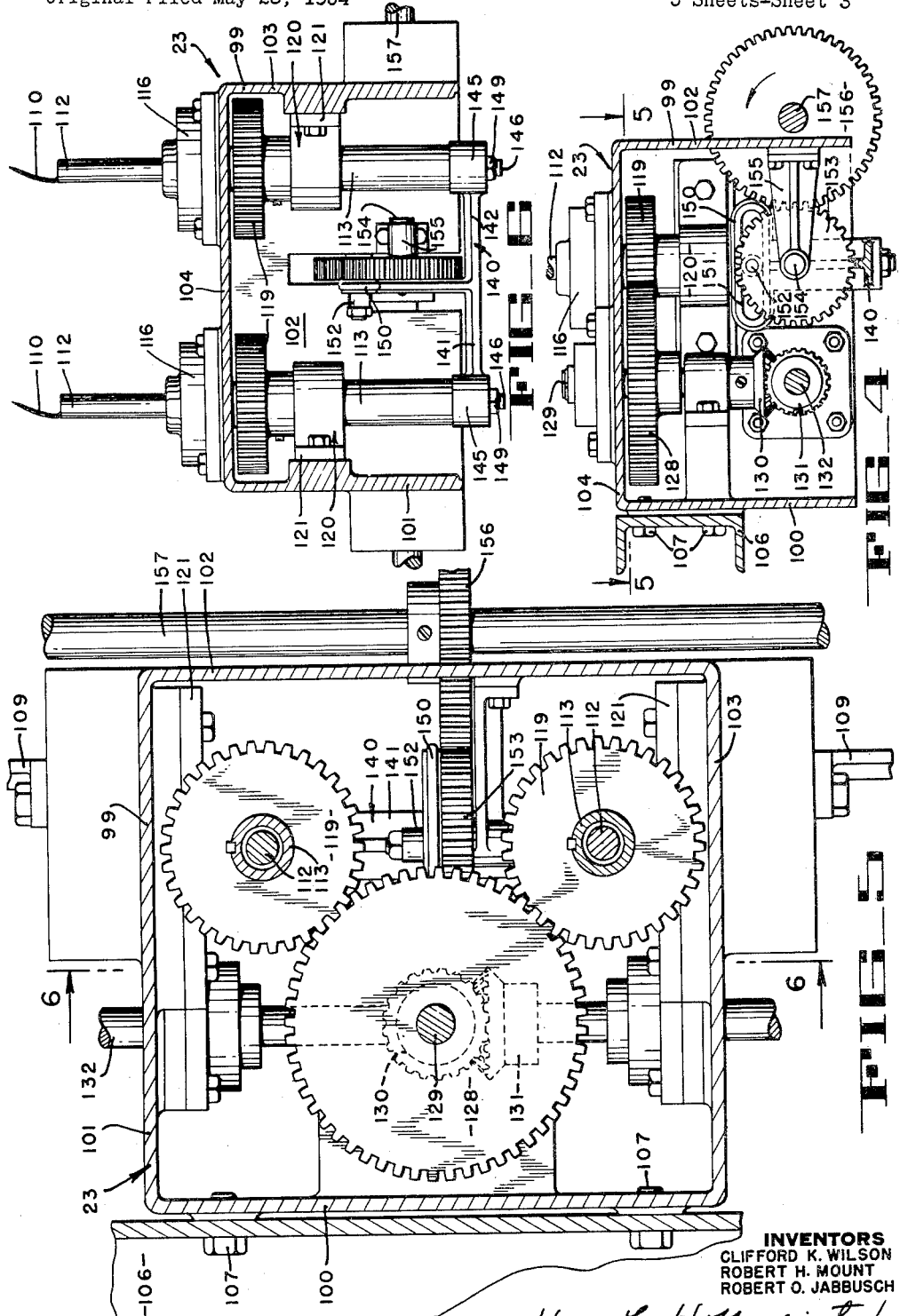
INVENTORS
CLIFFORD K. WILSON
ROBERT H. MOUNT
ROBERT O. JABBUSCH
BY Hans G. Hoffmeister
ATTORNEY

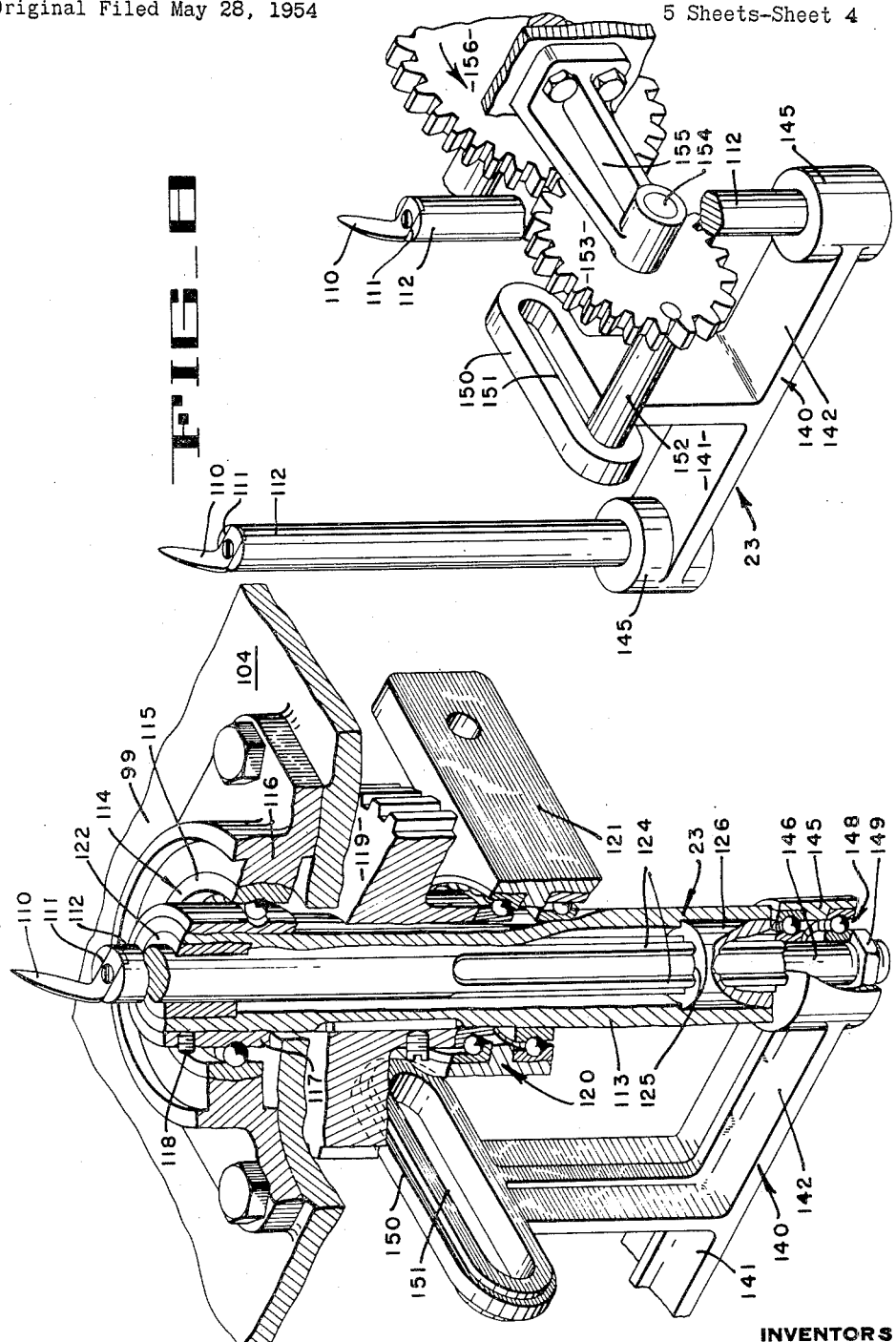

March 13, 1962  C. K. WILSON ET AL  3,024,822
TOMATO CORING MACHINE
Original Filed May 28, 1954  5 Sheets-Sheet 5
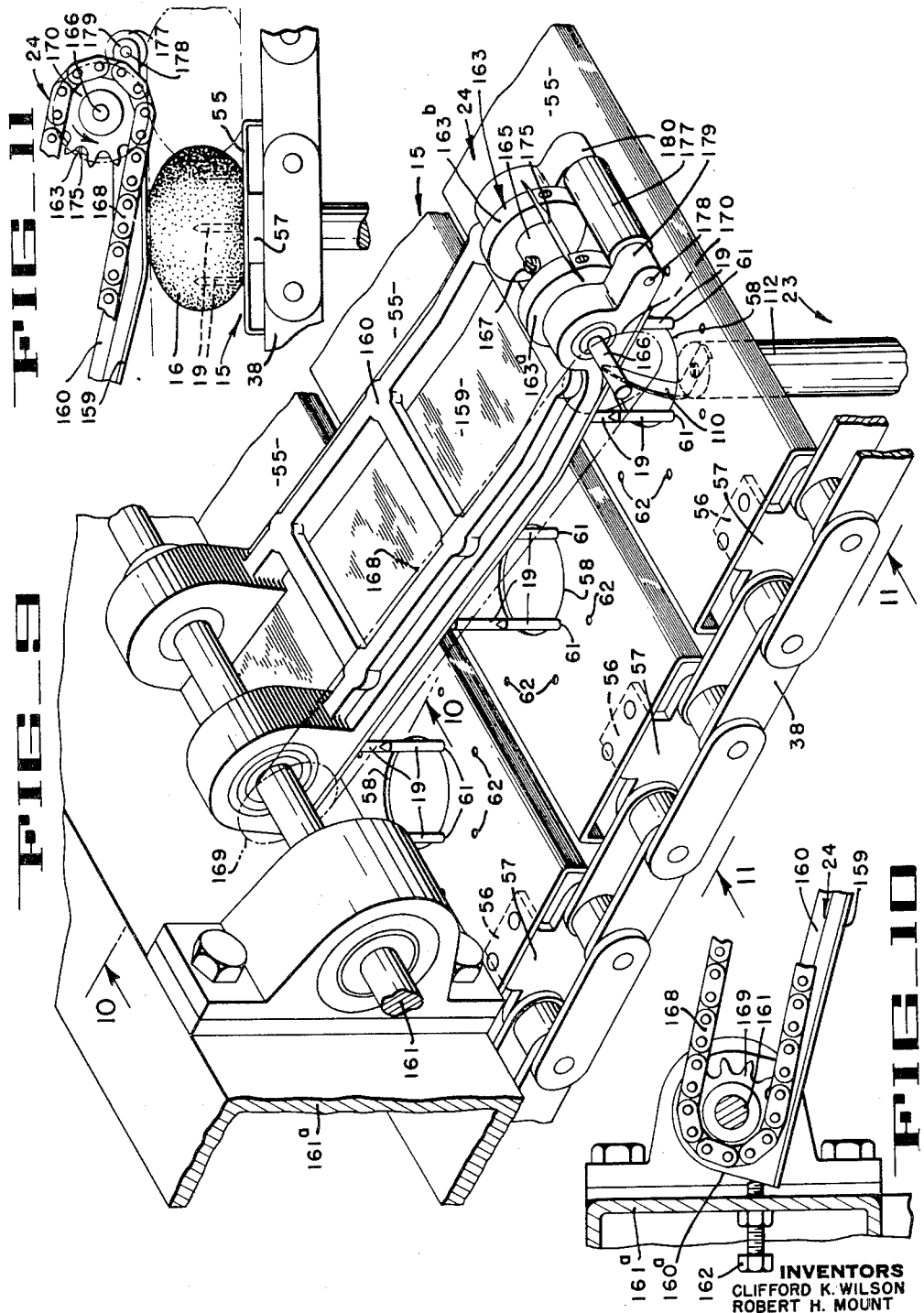
INVENTORS
CLIFFORD K. WILSON
ROBERT H. MOUNT
ROBERT O. JABBUSCH
BY 
ATTORNEY

United States Patent Office 3,024,822
Patented Mar. 13, 1962

3,024,822
TOMATO CORING MACHINE
Clifford K. Wilson, San Jose, Calif., Robert H. Mount, Hoopeston, Ill., and Robert O. Jabbusch, Green Bay, Wis., assignors to FMC Corporation, a corporation of Delaware
Original application May 28, 1954, Ser. No. 433,064, now Patent No. 2,862,535, dated Dec. 2, 1958. Divided and this application Oct. 27, 1958, Ser. No. 769,841
2 Claims. (Cl. 146—52)

This invention pertains to apparatus for processing fruits and vegetables and more particularly relates to an improved apparatus for coring fruit as it is moved through a processing machine.

While the peeling apparatus of the present invention may be used in the processing of a variety of different fruits and vegetables, it is particularly effective in processing tomatoes. Accordingly, in the following specification an installation adapted for feeding and coring tomatoes will be disclosed as a preferred embodiment of the invention.

The present application is a division of U.S. application for patent Serial No. 433,064, filed May 28, 1954, now Patent No. 2,862,535.

An object of this invention is to provide a coring mechanism which cooperates in a novel manner with an intermittently actuated endless chain conveyor to core a tomato while it is held in fixed, oriented position on the conveyor.

Another object is to provide an improved conveying mechanism capable of holding tomatoes and the like in fixed position as they are carried through a machine and subjected to various processing operations.

Other and further objects and advantages of the present invention will become apparent to one skilled in the art from the following detailed description taken in connection with the drawings:

FIG. 1 is a plan view of the tomato peeling machine of the present invention.

FIG. 2 is a side elevation of the machine of FIG. 1.

FIG. 3 is a diagrammatic perspective of one end of the tomato peeling machine, particularly showing the drive mechanism.

FIG. 4 is a vertical section through a coring unit taken along lines 4—4 of FIG. 3.

FIG. 5 is a horizontal section taken along lines 5—5 of FIG. 4.

FIG. 6 is a vertical section taken along lines 6—6 of FIG. 5.

FIG. 7 is a fragmentary diagrammatic perspective of the coring knife mounting used in the machine of the present invention.

FIG. 8 is a diagrammatic perspective of the mechanism for controlling the movements of the coring knives.

FIG. 9 is a fragmentary perspective of the blossom end cutting mechanism.

FIG. 10 is a fragmentary vertical section taken along lines 10—10 of FIG. 9.

FIG. 11 is a vertical fragmentary section taken along lines 11—11 of FIG. 9.

In FIGS. 1 and 2 the reference numeral 15 indicates an intermittently moving endless chain conveyor having an upper run movable toward the right, as seen in FIG. 2, carry tomatoes 16 through a series of processing stations provided in a frame support structure 17. At a loading station 18 each tomato 16 is impaled, stem end down, on upstanding prongs 19 which are mounted on the conveyor 15. As the tomato is carried to the right, it passes into a tank 20 in which it is submerged for a predetermined period of time in a solution of lye. After leaving the tank 20, the tomato is carried along an uncovered, upwardly inclined section 21 of the frame structure 17. In section 21, which will be referred to hereinafter as the holding section, excess lye is drained from the tomato and the tomato is exposed to the atmosphere for a fixed period of time during which the lye on the skin penetrates to the desired depth to effect loosening of the skin from the flesh of the tomato body. From the holding section, the tomato passes into a steam chamber 22 in which steam at atmospheric pressure raises the temperature of the tomato skin to a predetermined optimum peeling temperature. After leaving the steam chamber 22, the tomato is momentarily stopped over a coring unit 23 which has a blade movable upwardly through an opening in the conveyor to remove the core from the tomato and sever the skin at the bottom or stem end of the tomato body. Following the coring operation the tomato is moved under a floating cutter assembly 24 which removes the top or blossom end of the tomato. At this stage, the skin of the tomato has been completely loosened from the flesh of the tomato body and has been separated from its connections at the stem and blossom ends of the tomato. The tomato is now discharged from the conveyor 15 and drops a short distance onto a skin removing unit 26 where the skin is separated from the flesh of the tomato by a gentle pushing and rubbing action.

The support frame 17 (FIGS. 1 and 2) is a welded structure consisting of a series of spaced vertical channels 30 defining one side of the machine. Each of the channels 30 is directly opposite a similar vertical channel 31 in a line of channels which define the opposite side of the machine. The channels 30 and 31 are bolted to floor channels 33 (FIG. 2) and are connected in conventional manner by suitable transverse and longitudinal braces. Ball bearing pillow blocks 35 are mounted at various positions along the frame.

The chain conveyor 15 (FIG. 1) comprises three chains 36, 37 and 38 which extend longitudinally in spaced parallel relation along the entire length of the frame 17. Adjacent the loading station 18 the upper run of each chain is trained around a sprocket (not shown) which is keyed to a transverse rotatable shaft 40 (FIG. 2). As it travels toward the right, each chain (shown partly in phantom lines) is guided over a sprocket 41 keyed to a transverse rotatable shaft 42, then under two idler sprockets 43 and 44 which are keyed to rotatable shafts 45 and 46, respectively, over an idler sprocket (not shown) which is keyed to a rotatable shaft 48, and around a drive sprocket 50 (FIG. 3) keyed to a drive shaft 51. The lower run of each chain is held in horizontal position by idler sprockets 52 (FIG. 2). A standard chain tensioning device 53 is used with each chain.

To provide a support for the tomatoes as they are carried through the machine, the conveyor chains are fitted with channel-shaped transverse flights 55 (FIGS. 1 and 9) which are riveted to laterally projecting arms 56 of specially designed chain links 57. It will be understood that, on each of the outer chains 36 and 38 (FIG. 1), the bent link 57 is located on the inner side of the chain with the arm 56 projecting inwardly therefrom, while the middle chain 37 has bent links 57 on both sides with the arms 56 projecting in opposite directions. Each flight 55 is provided with three bored openings 58, 59 and 60 through which the coring knives are raised to remove the cores from tomatoes temporarily stopped thereover. Around each coring opening there are four equally spaced holes 61 (FIG. 9) in which the impaling pins 19 are welded. Surrounding the pins 19 is another set of holes 62 which are arranged in a uniform pattern to permit drainage of liquid and which serves as a sight gage to facilitate the centering of the tomato on the impaling pins. It will be noted in FIG. 1 that in each flight the openings 58 and 59 are adjacent, while the opening 60 in the flight is spaced from opening 59 but is close to the opening 60 of the laterally adjacent flight. Accordingly, three double rows of impaling pins 19 are formed on the conveyor flights with the pins in each row being about eight inches apart.

The conveyor 15 is driven by the drive shaft 51 (FIG. 3) on which the three drive sprockets 50 are keyed. The shaft 51 is intermittently rotated by a Geneva mechanism 63, the slotted element 64 of which is keyed to the shaft 51 while the driving element 65 is keyed to a continuously rotating shaft 66. The shaft 66 is parallel to the shaft 51 and is driven by an electric motor 67 that is drivingly connected to the shaft 66 through a chain 68 trained around a sprocket 70 on the motor shaft and a sprocket 71 keyed to the shaft 66.

At the loading station 18 (FIG. 2) the impaling pins 19 are shrouded behind a sheet metal guard 72 (FIGS. 1 and 2) adjacent which the operators stand while placing the tomatoes on the impaling pins.

The lye solution tank 20 is a sheet metal structure which extends entirely across the support frame 17 and is suitably secured thereto. An opening (not shown) is provided in the forward wall 73 of the tank above the level of the lye, affording an entrance passage for the chain conveyor 15. The conveyor 15 carries the tomatoes beneath the surface of the lye solution and out of the tank through an opening (not shown) in the rear wall 74. The tank 20 has removable covers 75 which are hinged to a transverse channel 75 of the frame 17. The density of the lye solution is controlled by means of an automatic density control instrument 77 that communicates with the tank through wall 74. To prevent the tomatoes from being dislodged as they pass through the lye solution, a woven wire belt 78 is suspended in the tank above each single row of impaling pins. These belts may be about four inches wide and have sufficient weight to hold the tomatoes on the pins. A steam coil 80 (FIG. 1) is mounted in the bottom of the tank to maintain the desired temperature of the solution.

The uncovered section 21 of the conveyor constitutes a holding section which is of a length sufficient to keep each intermittently advancing tomato exposed to the atmosphere for a predetermined period during which the lye penetrates to the desired depth. The section 21 is defined by side walls 81 and 82 and a sloping bottom wall 83 (FIG. 2) which is connected to the rear wall 74 of the lye tank and is arranged to return to the tank liquid that drains from the tomatoes.

The steam chamber 22 consists of sheet metal panels secured to frame elements to form a box-like structure. The forward wall 85 (FIG. 3) of the chamber is provided with six spaced openings 86 (three only being illustrated), one opening being in alignment with each single line of impaling pins, and each opening being large enough to permit the passage of a pin and a tomato impaled thereon. To prevent the escape of steam from the chamber 22, a gate 87 (FIGS. 1 and 2) of flexible material is secured to the inner surface of the forward wall 85 covering each opening 86. Each flexible gate may be secured to the wall only at its upper edge so that the gate will fold upwardly and ride over each tomato as it advances through the opening. Similar flexible gates 88 are mounted on the rear wall 89 of the steam chamber 22 adjacent exit openings 90 (FIG. 3) through which the lines of tomatoes pass as they leave the steam chamber. To maintain the temperature within the chamber at a desired level, a series of steam distributing pipes (not shown) are arranged in the steam chamber in such a manner that the steam emerging from the pipes at atmospheric pressure does not impinge directly on the tomatoes but is distributed around the tomatoes to provide a steam bath which maintains the temperature of the tomatoes at a desirable coring and peeling emperature.

After each flight of the conveyor leaves the steam chamber it is advanced to a position directly above a coring unit 23. In FIG. 1 three coring units 23 are indicated in dotted lines, one unit being aligned longitudinally of the machine with each double row of impaling pins. As will be explained presently, each unit 23 has a pair of continuously rotating coring knives which are spaced so that each knife is directly beneath one of the two coring openings provided in the conveyor flights for each double row of pins. When the conveyor comes to rest, each rotating coring knife is moved upwardly through an opening in the flight to engage a tomato and cut out the core.

Each coring unit 23 (FIG. 5) comprises a housing 99 provided by four side walls 100, 101, 102 and 103 and a top wall 104 (FIG. 6) suitably secured together, as by welding. Each housing 99 is supported from a transverse channel 106 (FIGS. 2 and 5) to which it is secured by tap bolts 107. In addition, the housing of the coring unit adjacent each side edge of the frame may be secured to a longitudinal frame member 108 (FIG. 2), while the housing of the center coring unit may be connected by spacer members 109 (FIG. 5) to the adjacent walls of side coring units.

Two knives 110 (FIG. 6) are provided in each coring unit, each knife 110 being secured in a recess 111 (FIG. 7) at the upper end of a coring shaft 112. The shaft 112 is mounted for vertical reciprocation relative to a sleeve 113 and for rotation with the sleeve 113. Each sleeve 113 (FIG. 7) is rotatably supported in the housing 99 by means of a bearing assembly 114 which has an outer race 115 pressed in a hub 116 mounted on the housing, and an inner race 117 secured by the set screw 118 to the sleeve 113. The sleeve 113 is rotated by means of a gear 119 which is keyed to the sleeve inside the housing. Each gear 119 rests on a bearing assembly 120 which is supported from an adjacent wall of the housing by a support bracket 121. The coring knife shaft 112 is slidably engaged near its upper end in a bushing 122 (FIG. 7) that is pressed in the upper end of the sleeve 113 and, near its lower end, the shaft 112 is provided with splines 124 that mate with splines 125 formed in a collar 126 pressed into the lower end of the sleeve 113. In this manner, rotation of each gear 119 will cause rotation of the sleeve 113 with resultant rotation of the collar 126 and the shaft 112 of the coring knife.

Both gears 119 are rotated by a single drive gear 128 (FIGS. 4 and 5) which is keyed to a shaft 129. A bevel gear 130, keyed on the lower end of the shaft 129, is in mesh with a bevel gear 131 carried on the end of a drive shaft 132 which extends entirely across the housing 99 and through the housing walls 101 and 103 (FIG. 5) and is driven from an independent motor 133 (FIG. 3) through a chain 134 which is trained around a sprocket 136 on the shaft 132 and around a sprocket 137 on the motor shaft.

The splined connection of each shaft 112 with the rotatable sleeve 113 permits the shaft to be vertically reciprocated while it is being rotated. Vertical reciprocation of the shaft 112 is effected through a yoke 140 (FIGS. 7 and 8) which is mounted in the housing 99 and is provided with oppositely projecting arms 141 and 142, each of which carries an apertured hub 145 at its outer end. A reduced diameter portion 146 (FIG. 7) of the knife shaft 112 is disposed in a bearing assembly 148 provided in the aperture of each hub 145 and the knife shaft is locked in the inner race of the bearing assembly by a nut 149 threaded on the lower end of the shaft.

The yoke 140 has a central upstanding T-shaped arm 150 which has an elongated, horizontally disposed slot 151 therein. A stud 152 (FIGS. 4 and 8) is secured in the peripheral portion of a gear 153 which is journaled for rotation on a stub shaft 154 carried at the outer end of a bracket 155 that is mounted in fixed position on the wall 102 of the housing 99. The gear 153 is in mesh with a gear 156 which is keyed to a shaft 157 (FIG. 3) driven by a chain 158 from the continuously rotating drive shaft 66. As best seen in FIG. 8, the stud 152 on the gear 153 extends into the slot 151 of the T-shaped arm 150 of the yoke 140. As the gear 153 rotates, the stud 152 travels back and forth in the slot causing the yoke to be raised and lowered. Since the conveyor 15 is intermittently advanced by the same drive shaft 66 which intermittently raises the yoke on which the two continuously rotating coring knives are mounted, it is evident that the raising of the yoke can be coordinated with the movement of the conveyor so that the continuously rotating knives will be raised through openings in the conveyor flight to core tomatoes thereon while the flight is at rest directly above the coring knives.

While the tomato is at rest above the coring knife and during the actual coring of the tomato, the tomato is held down by a flat steep plate 159 (FIG. 11) which is fastened to the lower surface of a bracket 160 of the cutter assembly 24. As seen in FIG. 3, there are six brackets 160, one directly above each single line of impaling pins. Each bracket is mounted in freely pivoting relation on a rotatable shaft 161 which is secured on a channel 161a (FIG. 1) which is mounted transversely of the machine adjacent the rear wall of the steam chamber 22, and the lower pivoted position of each bracket is determined by the abutment of a rear portion 160a (FIG. 10) of the bracket against an adjustable screw 162 threaded in the channel 161a. After the core of the tomato has been removed and the coring knife has been moved to a position below the conveyor 15, the conveyor is moved forwardly, or to the right as seen in FIG. 11, bringing the tomato under a cutter 163 which is rotatably mounted adjacent the outer end of the bracket. The cutter 163 (FIG. 9) is a spool-like structure consisting of two spaced cylindrical portions 163a and 163b connected by a sleeve 165, of reduced diameter, which is keyed to a drive shaft 166 by a set screw 167. The shaft 166 is continuously rotated by means of a chain 168 (indicated in phantom lines on FIG. 9) which is trained around a sprocket 169 keyed to the rotatable shaft 161 and around a sprocket 170 keyed to the drive shaft 166. The shaft 161 is continuously driven by an electric motor 172 (FIG. 3) through a belt and pulley drive 173. A cutter blade 175 (FIG. 9) is mounted in the flanges 163a and 163b in a substantially radial position. At the extreme outer end of each bracket 160 a gaging roller 177 is rotatably mounted on a shaft 178 which extends between arms 179 and 180. As shown in dot-dash lines in FIG. 11, just as the cutter finishes cutting off the blossom end of the tomato, the tomato is contacted by the roller 177 thereby preventing the bracket from pivoting downwardly and causing the rapidly rotating cutting blade 175 to cut into the rear portion of the tomato. After the blossom end of the tomato has been severed by the blade 175, the tomato is carried around the end of the endless chain conveyor 15 and is discharged by gravity onto an inclined chute 185 (FIG. 3) from which the tomato drops a short distance onto an endless belt 186 of the skin removing unit 26.

The construction and operation of the skin removing unit 26 is described in detail in the above-mentioned application Serial No. 433,064, now Patent No. 2,862,535.

In summary, at the loading section 18 (FIG. 2) a tomato is impaled stem end down on the pins 19 in centered position over an opening in the endless chain conveyor 15. As the upper run of the conveyor is moved intermittently toward the right in FIG. 2, the tomato is carried downwardly into and through the lye solution in the tank 20. While the tomato passes through the tank, a wire mesh belt 78 bears on the upper surface of the tomato to prevent it from being dislodged from the impaling pins. After leaving the lye tank 20, the tomato is intermittently advanced through the upwardly inclined holding section 21 wherein it is exposed to atmospheric conditions for a predetermined time to permit the lye to penetrate the skin to a depth sufficient to completely loosen the skin from the flesh of the tomato body. The tomato is then moved into the steam chamber 22 where saturated steam raises the temperature of the tomato skin to a desirable peeling temperature. The tomato is then carried out of the steam chamber and stopped directly above a continuously rotating coring knife which is then raised, by means of the yoke 140 (FIG. 7) to penetrate the tomato at the stem end and core the tomato. The blossom end of the tomato is then removed by the rapidly rotating cutter 163 and the tomato is discharged over the end of the conveyor onto the skin removing unit 26.

While a preferred apparatus has been described in the present application, it will be understood that it is capable of variations and modifications within the scope of the invention. It is to be understood, therefore, that the scope of the invention should be limited only by the scope and proper interpretation of the claims appended hereto.

Having thus described our invention what we claim as new and desire to protect by Letters Patent is:

1. Apparatus for coring tomatoes or the like comprising a conveyor having support means for transporting tomatoes longitudinally along a predetermined path, said support means having a plurality of coring apertures formed therein disposed in longitudinally spaced relation along said conveyor path, a plurality of impaling pins on said support means surrounding each coring aperture for retaining a tomato over the coring aperture and for holding it against rotation, means providing a plurality of drain apertures surrounding said pins and defining a visual centering gauge for a tomato placed on said pins on said support means, a rotary coring knife disposed immediately below said support means, means for intermittently advancing said conveyor a distance equal to the longitudinal spacing between adjacent coring apertures, and successively positioning said coring apertures in alignment with said cutter, means for moving said cutter upwardly through a coring aperture aligned therewith and into engagement with a tomato held by said impaling pins, means for rotating said cutter, and means for lowering said cutter back through said coring aperture.

2. Apparatus for coring tomatoes or the like comprising a conveyor having support means for transporting tomatoes longitudinally along a predetermined path, said support means having a plurality of pairs of coring apertures formed therein, the apertures of each pair being spaced laterally from each other, and each pair being disposed in longitudinally spaced relation along said conveyor path, means adjacent each coring aperture for retaining a tomato over the aperture and for holding it against rotation, a pair of rotary coring cutters disposed immediately below said support means, said cutters being spaced laterally of the conveyor from each other by a distance equal to the lateral spacing between the apertures of each pair, means for intermittently advancing said conveyor a distance equal to the longitudinal spacing between adjacent coring apertures to successively position each pair of laterally adjacent apertures directly above said pair of cutters, a bar disposed below said conveyor support means and extending laterally of said conveyor, means mounting said cutters on said bar, and means for reciprocating said bar vertically toward and away from said conveyor support means to raise said cutters simultaneously through the pair of coring apertures thereabove, said reciprocating means including a driven member connected to said bar and having a horizontal slot therein, a drive pin disposed in said slot, and power actuated means for moving said pin in a circular path.

(References on following page)

References Cited in the file of this patent

UNITED STATES PATENTS

| | | | |
|---|---|---|---|
| 1,717,827 | Ayars | June 18, | 1929 |
| 1,737,087 | Horstmann | Nov. 26, | 1929 |
| 1,762,438 | Hamilton et al. | June 10, | 1930 |
| 1,923,712 | Deitz | Aug. 22, | 1933 |
| 2,076,496 | Deitz | Apr. 6, | 1937 |
| 2,258,035 | Sjostrom | Oct. 7, | 1941 |
| 2,788,037 | Carter | Apr. 9, | 1957 |
| 2,835,294 | Rigney | May 20, | 1958 |